Dec. 30, 1924.
B. J. FEHR
1,521,518
LOOSE WHEEL CAR AXLE STRUCTURE
Filed July 26, 1924
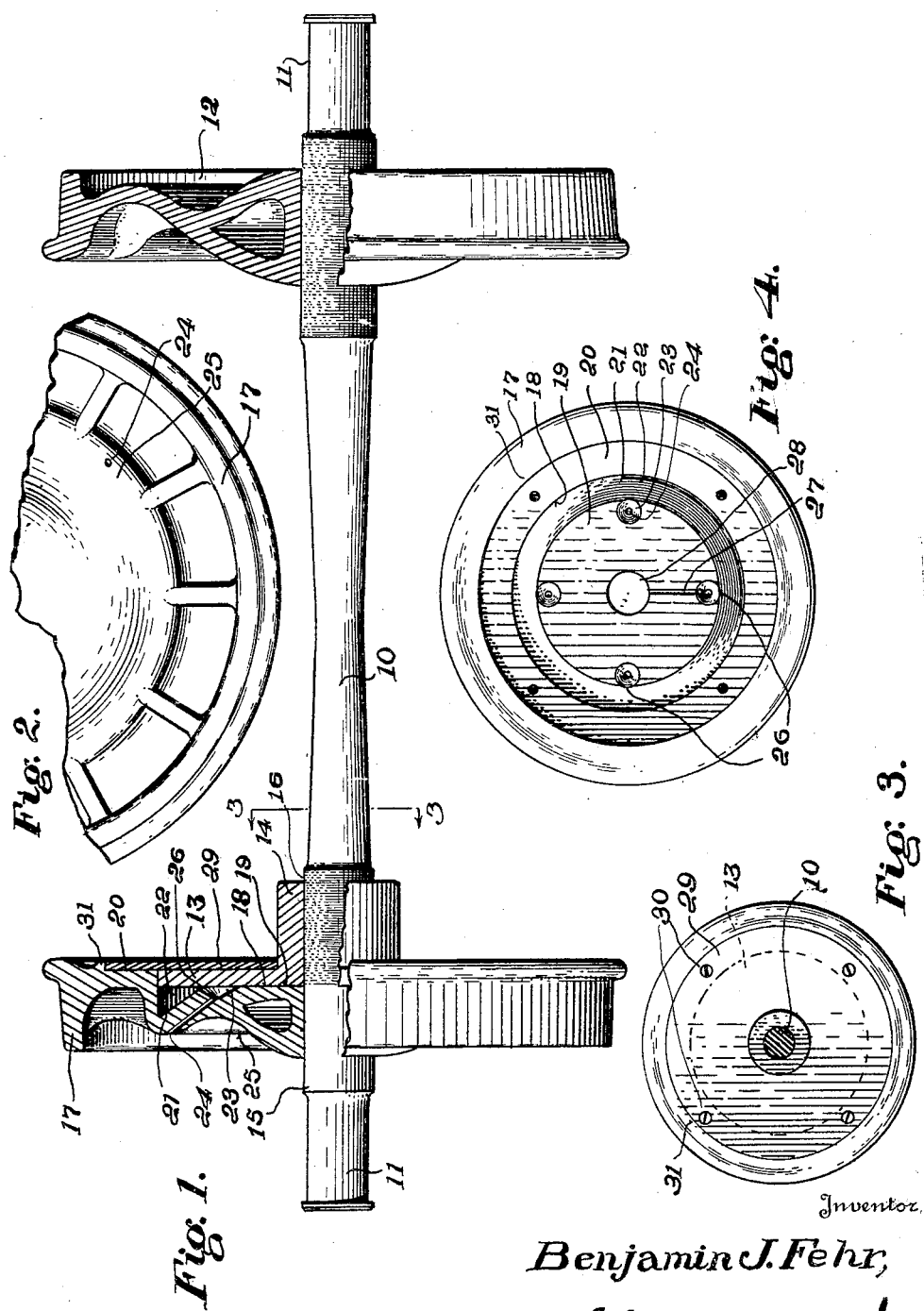
Inventor,
Benjamin J. Fehr,
By H. S. Woodward
Attorney.

Patented Dec. 30, 1924.

1,521,518

UNITED STATES PATENT OFFICE.

BENJAMIN J. FEHR, OF ROANOKE, ILLINOIS.

LOOSE-WHEEL CAR-AXLE STRUCTURE.

Application filed July 26, 1924. Serial No. 728,424.

*To all whom it may concern:*

Be it known that I, BENJAMIN J. FEHR, a citizen of the United States, residing at Roanoke, in the county of Woodford and State of Illinois, have invented certain new and useful Improvements in Loose-Wheel Car-Axle Structures, of which the following is a specification.

The invention has for an object to effect improvements in the specific structure of a car wheel and axle of this type to the end that they may be produced at low cost to operate with high efficiency and have special advantages in various ways.

It is particularly a purpose to minimize the number of parts required and the factory operations involved for their production and assembly.

A further purpose is to provide a novel oil reservoir construction in the wheel body which will obviate necessity for special coring and may be produced in the same operations as used in facing the wheel and its bore. Another aim is to provide an efficient thrust bearing for wheels and axles of this type.

Additional objects, advantages and features of invention consist in structural features, the arrangement and combination of parts as may be more fully understood from the following description and accompanying drawings, in which—

Figure 1 is a longitudinal sectional view of a wheel and axle constructed in accordance with my invention.

Figure 2 is a fragmentary left end view thereof.

Figure 3 is a cross section on the line 3—3 of Figure 1.

Figure 4 is an elevation of the wheel detached, from the right hand side in Figure 1.

There is illustrated a car wheel and axle structure including an axle proper 10 of usual dimensions, provided with the customary journals 11 at the ends, and having a wheel 12 of approved type shrunk thereon at one end.

Inwardly of the journal 11 at the opposite end of the axle a thrust flange 13 is provided, having an integral hub part 14 shrunk onto the axle, or otherwise secured in the mounting of wheels, the outer side of the flange extending flush from the axle in a plane at right angles to the axis of the shaft. A journal part 15 is continued inwardly from the part 11 to the flange and may be formed and finished in the same operations involved for the journal. The facing 16 of the axle to receive the hub 14 may also be turned at the same time as the turning of the journal portion 15, without variation of size, thus requiring no separate adjustment of the tool. The flange 13 is smoothly finished on each side, and on the periphery.

A loose wheel 17 is mounted revolubly on the journal portion 15 and is formed with a circular recess 18 having a planiform inner face 19 to abut the flange 13 and being smoothly finished to snugly receive the flange therein flush with the side face 20 of the wheel. The extreme outer part of this recess is deepened, forming an annular channel 21 which provides a space 22 adjacent the outer part of the flange 13 to serve as an oil reservoir. A series of conical recesses 23 are formed in the face 19 of the recess, from each of which a passage 24 extends to the outer side face 25 of the wheel being also inclined outwardly away from the axle toward their outer parts. The inner ends of these passages are spaced from the channel 21, but the conical recesses 23 intersect the channel forming feed grooves 26 not as deep as the channel, the side of which next the recesses 23 slopes, by which the deepening mentioned is attained. A feed groove 27 also extends from one or more of the recesses 23 to the bore 28 (Figure 4) through the wheel 17.

Before the wheel and flange 13 are both permanently fixed upon the axle, a retainer ring 29 is slipped over the axle and left loosely thereon. This ring is adapted to fit snugly around the hub 14, being of planiform shape and adapted to fit snugly the face 20 of the wheel without the recess and also afford a good bearing against the flange 13. The ring may be stamped from heavy sheet metal and is apertured to receive assembly bolts 30 by which it is secured to the wheel, the latter being correspondingly tapped and threaded to receive the bolts. If desired, a flange 31 may be formed on the wheel to snugly circumscribe the ring when in place and protect the same from damage or displacement by striking obstructions on the track.

The journal 16 corresponds in diameter to the full diameter of the axle at the outer side of the journal 14, whereby after the wheel is passed over the journal 14 it will snugly fit the journal 15. In this way the regular journal 14 may be reduced to less than the full diameter of the axle, which is a customary practice found desirable for the alinement of the saddle bearing bushings of journal boxes.

It should be noted that one or more of the passages 24 will always be in position to drain oil downwardly to the conical recesses 23 when such oil is introduced at the outer ends of such properly positioned passages, as may be done with a spout can. Such oil will be held by gravity in the conical recess 23 abutting the flange 13 until the wheel is moved, when it will either drain to one side of the conical recess and finally out into the channel 21 through the groove 26 (when the recess is at the lower side of the wheel) or be induced to so move by centrifugal force as the wheel attains speed by movement of a train, and in this manner the oil is prevented from flowing back out through the passage 24. It may be noted that the outer ends of the passages 24 are radially further from the axle than the outlets of the grooves 26 into the channel 21, so that oil may be fed in sufficient quantity to fill the recess 23 and flow into the channel 21 as desired. Some oil would then remain in the passage 24 which would waste in part if the passages are left without closures at their outer ends, but such waste would be inconsiderable, and unimportant.

The degree of movement of the wheel on the axle is such and so infrequent that a very small quantity of lubricant requires to be maintained in the wheel, and this quantity will always be accommodated in a manner to prevent its access to the passages 24 from within the wheel, so that material waste and drying of the bearing thereby will be prevented by the construction employed.

It will be seen that by the construction presented only two very plain elements are required in addition to those found in ordinary car wheels and axles for the provision of a loose wheel axle. The familiar steps of turning the journal and fixed wheel mounting part on the axle are easily extended to provide the additional journal surface and hub mounting part of my axle as represented. Further, the fitting of the wheel to the flange 13 may be accomplished without sacrificing essential strength in the wheel.

I am aware that constructions have been heretofore provided for enabling differential movement between opposite wheels on car axles, but

I claim:

1. In a car wheel and axle having a fixed wheel at one end, a car journal and a wheel journal inwardly thereof adjacent the opposite end of the axle, a thrust flange fixed upon the axle immediately within the wheel journal, and having a bearing face equalling the major part of the area circumscribed by the wheel tread, a wheel snugly fitted on said flange, and a retaining member on the wheel engaging said flange.

2. In a car wheel and axle, an axle having a fixed wheel and journal at one end, a car journal and wheel journal at the other end, a wheel revoluble on the wheel journal, a thrust flange fixed upon the axle abutting the wheel and, said wheel having a bearing face fitted to the flange and having an annular reservoir channel adjacent the outer part of the flange, a retainer ring fixed on the wheel and enclosing the flange, ducts being formed in the parts for feeding lubricant to the channel.

3. In a car wheel and axle, an axle having a fixed wheel thereon and car journals at each end, a wheel journal immediately inward of the car journal at the end opposite said first wheel, a thrust flange having a hub bored the same size as the fixed wheel and similarly fixed on the axle inward of the wheel journal, a wheel revoluble on the wheel journal snugly fitted to said flange, and means to retain the wheel upon the axle.

4. In a car wheel and axle, an axle and wheels as described in claim 3 in which the revoluble wheel is recessed to snugly receive the said flange, the outer part of the recess being deepened to provide an annular channel adjacent the flange, said means to retain the wheel comprising a ring snugly fitting the said flange and wheel.

5. In a car wheel and axle, an axle and wheels as described in claim 3 in which the revoluble wheel is recessed to snugly receive the said flange the outer part of the recess being deepened to provide an annular channel adjacent the outer part of the flange, conical recesses being formed in the intermediate part of the first named recess communicating at one side only with said channel intermediately of its depth, passages for lubricant extending centrally from the conical recesses to the opposite face of the wheel and being inclined outwardly from the axle, and retaining means to hold said flange snugly in said first named recess and abutting the conical recesses.

In testimony whereof I affix my signature.

BENJAMIN J. FEHR.